(12) United States Patent
Sun et al.

(10) Patent No.: US 9,570,743 B2
(45) Date of Patent: Feb. 14, 2017

(54) POSITIVE ACTIVE MATERIAL PRECURSOR FOR RECHARGEABLE LITHIUM BATTERY, METHOD OF PREPARING POSITIVE ACTIVE MATERIAL FOR RECHARGEABLE LITHIUM BATTERY USING THE SAME, AND RECHARGEABLE LITHIUM BATTERY INCLUDING THE PREPARED POSITIVE ACTIVE MATERIAL FOR RECHARGEABLE LITHIUM BATTERY

(75) Inventors: Yang-Kook Sun, Seoul (KR); Hyo-Jin Kim, Gyeongsangbuk-do (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 170 days.

(21) Appl. No.: 13/822,861

(22) PCT Filed: Sep. 14, 2011

(86) PCT No.: PCT/KR2011/006778
§ 371 (c)(1),
(2), (4) Date: Mar. 13, 2013

(87) PCT Pub. No.: WO2012/036462
PCT Pub. Date: Mar. 22, 2012

(65) Prior Publication Data
US 2013/0183585 A1     Jul. 18, 2013

(30) Foreign Application Priority Data

Sep. 14, 2010   (KR) .................. 10-2010-0090052

(51) Int. Cl.
*H01M 4/131*    (2010.01)
*H01M 4/525*    (2010.01)
(Continued)

(52) U.S. Cl.
CPC ............ *H01M 4/525* (2013.01); *H01M 4/131* (2013.01); *H01M 4/1391* (2013.01);
(Continued)

(58) Field of Classification Search
CPC ............................ H01M 4/131; H01M 4/525
(Continued)

(56) References Cited

U.S. PATENT DOCUMENTS

2004/0091779 A1   5/2004   Kang et al.
2006/0239883 A1   10/2006  Kang et al.
(Continued)

FOREIGN PATENT DOCUMENTS

KR    1020100042145 A      4/2010
WO    WO 2009120019 A1 *   10/2009
WO    WO 2009145494 A1 *   12/2009  ........... C01G 53/006

OTHER PUBLICATIONS

International Search Report mailed Apr. 20, 2012; PCT/KR2011/006778.

*Primary Examiner* — Jonathan Jelsma
(74) *Attorney, Agent, or Firm* — Ladas & Parry LLP

(57) ABSTRACT

Provided are a positive active material precursor for a rechargeable lithium battery including a metal oxide represented by Chemical Formula 1, a positive active material for a rechargeable lithium battery that is obtained by using the positive active material precursor for a rechargeable lithium battery and includes a compound represented by a Chemical Formula 2, and a rechargeable lithium battery including the positive active material for a rechargeable lithium battery.

14 Claims, 9 Drawing Sheets

(51) Int. Cl.
  *H01M 4/505*   (2010.01)
  *H01M 10/0525* (2010.01)
  *H01M 4/1391*  (2010.01)
  *H01M 4/13915* (2010.01)

(52) U.S. Cl.
  CPC ....... *H01M 4/13915* (2013.01); *H01M 4/505* (2013.01); *H01M 10/0525* (2013.01); *Y02E 60/122* (2013.01)

(58) Field of Classification Search
  USPC ........................................................ 429/223
  See application file for complete search history.

(56) References Cited

U.S. PATENT DOCUMENTS

| | | | | |
|---|---|---|---|---|
| 2007/0292763 | A1* | 12/2007 | Park ..................... | C01G 45/006 429/231.1 |
| 2009/0117469 | A1* | 5/2009  | Hiratsuka et al. ......... | 429/231.8 |
| 2009/0258296 | A1  | 10/2009 | Kawasato et al. | |
| 2009/0272939 | A1* | 11/2009 | Sun et al. .................. | 252/182.1 |
| 2009/0297947 | A1* | 12/2009 | Deng et al. ................ | 429/218.1 |
| 2011/0027651 | A1* | 2/2011  | Sun et al. ..................... | 429/220 |
| 2011/0089367 | A1* | 4/2011  | Shin ..................... | C01G 53/006 252/182.1 |

* cited by examiner

POSITIVE ACTIVE MATERIAL PRECURSOR FOR RECHARGEABLE LITHIUM BATTERY, METHOD OF PREPARING POSITIVE ACTIVE MATERIAL FOR RECHARGEABLE LITHIUM BATTERY USING THE SAME, AND RECHARGEABLE LITHIUM BATTERY INCLUDING THE PREPARED POSITIVE ACTIVE MATERIAL FOR RECHARGEABLE LITHIUM BATTERY

TECHNICAL FIELD

This disclosure relates to a positive active material precursor for a rechargeable lithium battery, a method of preparing a positive active material precursor for a rechargeable lithium battery using the same, and a rechargeable lithium battery including the prepared positive active material for a rechargeable lithium battery.

BACKGROUND ART

Batteries generate electric power by using materials capable of electrochemical reactions at positive and negative electrodes. For example, a rechargeable lithium battery generates electricity due to a change of chemical potentials when lithium ions are intercalated/deintercalated at positive and negative electrodes.

The rechargeable lithium battery includes a material that can reversibly intercalate/deintercalate lithium ions as positive and negative active materials, as well as an organic electrolyte solution or a polymer electrolyte charged between the positive and negative electrodes.

As for a negative active material for a lithium rechargeable battery, various carbon-based materials such as artificial graphite, natural graphite, and hard carbon that are capable of intercalating and deintercalating lithium ions have been used.

As for a positive active material for a lithium rechargeable battery, a lithium metal composite compound is used. For example metal composite oxides such as $LiCoO_2$, $LiMn_2O_4$, $LiNiO_2$, $LiNi_{1-x}Co_xO_2$ ($0<x<1$), $LiMnO_2$, $LiFePO_4$, and the like, have been researched.

DISCLOSURE

Technical Problem

One embodiment provides a positive active material precursor for a rechargeable lithium battery including a metal oxide having a high tap density.

Another embodiment provides a positive active material for a rechargeable lithium battery obtained by using the positive active material precursor for a rechargeable lithium battery, and thereby having a high tap density and improved energy density as well as electrical conductivity.

Yet another embodiment provides a method of preparing a positive active material for a rechargeable lithium battery by using the metal oxide-type positive active material precursor for a rechargeable lithium battery and thereby having improved productivity and economy.

Technical Solution

A positive active material precursor for a rechargeable lithium battery according to one embodiment includes a metal oxide represented by the following Chemical Formula 1.

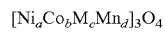  [Chemical Formula 1]

In the above Chemical Formula 1,
M is a transition element,
$0.2 \leq a \leq 0.9$, $0 \leq b \leq 0.5$, $0 \leq c \leq 0.05$, $0.1 \leq d \leq 0.9$, and $a+b+c+d=1$.

For example, the M may include Ti, V, Cr, Fe, Cu, Zn, Y, Zr, Nb, Mo, W, or a combination thereof.

The metal oxide represented by the above Chemical Formula 1 may be a spherically-shaped powder, and may have an average particle diameter of about 5 μm to about 15 μm. The metal oxide represented by the above Chemical Formula 1 may have a tap density of about 1.0 g/cc to about 2.0 g/cc.

A positive active material for a rechargeable lithium battery according to another embodiment includes a compound represented by the following Chemical Formula 2, and the positive active material for a rechargeable lithium battery is obtained by using the positive active material precursor for a rechargeable lithium battery.

  [Chemical Formula 2]

In the above Chemical Formula 2,
M is a transition element,
$-0.05 \leq x \leq 0.25$,
$0 \leq y \leq 0.05$,
$0.2 \leq a \leq 0.9$, $0 \leq b \leq 0.5$, $0 \leq c \leq 0.05$, $0.1 \leq d \leq 0.9$, and $a+b+c+d=1$.

Examples of the M are the same as described above.

The positive active material for a rechargeable lithium battery may include a secondary particle formed by agglomerating a plurality of primary particles. Herein, the primary particles may have an average particle diameter of about 1 nm to about 500 nm.

The positive active material for a rechargeable lithium battery may have a tap density of about 1.5 g/cc to about 2.5 g/cc, and a specific surface area of about 1.0 m²/g to about 10.0 m²/g.

A method of preparing a positive active material for a rechargeable lithium battery includes: mixing at least one of a nickel source, a cobalt source, and a manganese source, and a solvent, under an oxidizing atmosphere to form a positive active material precursor for a rechargeable lithium battery represented by the above Chemical Formula 1; and mixing the positive active material precursor and a lithium source followed by heat treatment. Herein, the prepared positive active material for a rechargeable lithium battery may include a compound represented by the above Chemical Formula 2.

The oxidizing atmosphere may include an air atmosphere, an oxygen ($O_2$) atmosphere, or a combination thereof.

The nickel source may include nickel sulfate, nickel nitrate, nickel acetate, nickel chloride, nickel phosphate, or a combination thereof.

The cobalt source may include cobalt sulfate, cobalt nitrate, cobalt acetate, cobalt chloride, cobalt phosphate, or a combination thereof.

The manganese source may include manganese sulfate, manganese nitrate, manganese acetate, manganese chloride, manganese phosphate, or a combination thereof.

The solvent may include water, ethanol, methanol, or a combination thereof.

In the step of forming the positive active material precursor for a rechargeable lithium battery, the nickel source may be mixed in an amount of about 10 wt % to about 90 wt %, the cobalt source may be mixed in an amount of about 0 wt % to about 50 wt %, the manganese source may be mixed in an amount of about 10 wt % to about 90 wt %, and the solvent may be mixed in an balance amount.

In the step of forming the positive active material precursor, a transition element source may be further mixed, and the transition element source may include a sulfate, nitrate, acetate, chloride, or phosphate of a transition element, or combination thereof.

The lithium source may include lithium nitrate ($LiNO_3$), lithium acetate ($CH_3COOLi$), lithium carbonate ($Li_2CO_3$), lithium hydroxide (LiOH), or a combination thereof.

The active material precursor for a rechargeable lithium battery and the lithium source may be mixed in a mole ratio of about 1.0:0.95 to about 1.0:1.25.

The heat treatment may be performed through primary firing at a temperature of about 250° C. to about 650° C. and secondary firing at a temperature of about 700° C. to about 1100° C.

According to yet another embodiment, a rechargeable lithium battery that includes a positive electrode including the positive active material, a negative electrode including a negative active material, and an electrolyte is provided.

Other embodiments are described in the following detailed description.

Advantageous Effects

The positive active material precursor for a rechargeable lithium battery according to the present embodiment includes a metal oxide, and has an improved tap density. The positive active material for a rechargeable lithium battery prepared by using the same has a high tap density, and improved energy density and electrical conductivity, as well as improved charge and discharge characteristics, cycle-life characteristics, and high rate capability.

MODE FOR INVENTION

Figure 1:
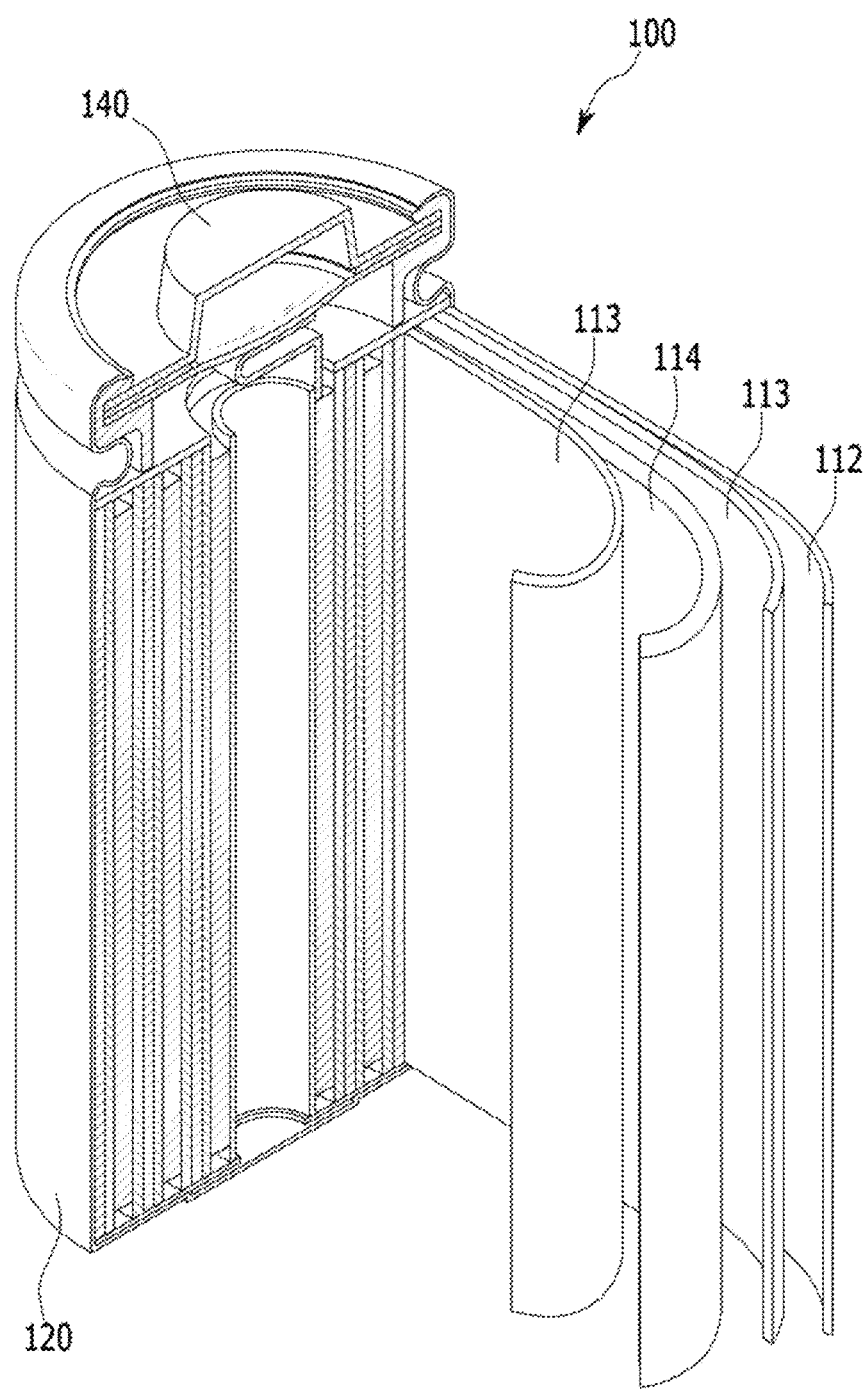
FIG. 1 is a schematic view of a rechargeable lithium battery according to one embodiment of the present invention.

The present invention will be described more fully hereinafter with reference to the accompanying drawings, in which exemplary embodiments of this disclosure are shown. However, these embodiments are exemplary, and the present invention is not limited thereto and is defined by the claims described later.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

According to one embodiment, a positive active material precursor for a rechargeable lithium battery includes a metal oxide represented by the following Chemical Formula 1.

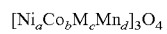   [Chemical Formula 1]

In the above Chemical Formula 1,

M is a transition element, $0.2 \le a \le 0.9$, $0 \le b \le 0.1$, $0 \le c \le 0.05$, $0.1 \le d \le 0.9$, and $a+b+c+d=1$. Specifically, $0.2 \le a \le 0.3$, $0 \le b \le 0.2$, $0 \le c \le 0.01$, $0.6 \le d \le 0.8$, and $a+b+c+d=1$.

The positive active material precursor for a rechargeable lithium battery includes a metal oxide represented by the above Chemical Formula 1, and thereby has a high tap density. Therefore, the positive active material for a rechargeable lithium battery prepared by using the same has a high tap density, improved energy density and electrical conductivity, and improved output characteristics and cycle-life characteristics.

The metal oxide represented by the above Chemical Formula 1 is a pure crystallite without impurities, and has improved crystallinity, and therefore the positive active material precursor for a rechargeable lithium battery including the same is effectively mixed with a lithium source to provide a positive active material for a rechargeable lithium battery.

Specifically, the M may include Ti, V, Cr, Fe, Cu, Zn, Y, Zr, Nb, Mo, W, or a combination thereof.

The metal oxide represented by the above Chemical Formula 1 may be a spherically-shaped powder.

The metal oxide represented by the above Chemical Formula 1 may have an average particle diameter of about 5 µm to about 15 µm. When the metal oxide represented by the above Chemical Formula 1 has an average particle diameter within the above range, the metal oxide represented by the above Chemical Formula 1 is harder and has a heavier mass than a nano-sized particle. Thereby, when an electrode is fabricated using a positive active material precursor for a rechargeable lithium battery including the metal oxide represented by the above Chemical Formula 1, the positive active material precursor for a rechargeable lithium battery and a positive active material for a rechargeable lithium battery formed from the positive active material precursor for a rechargeable lithium battery does not have cracks or deformations. The metal oxide represented by the above Chemical Formula 1 has a reduced specific surface area, and thereby a positive active material for a rechargeable lithium battery using the metal oxide represented by the above Chemical Formula 1 may suppress a side reaction with an electrolyte solution. Specifically, the metal oxide represented by the above Chemical Formula 1 may have an average particle diameter of about 7 µm to about 10 µm.

The metal oxide represented by the above Chemical Formula 1 may have a tap density of about 1.0 g/cc to about 2.0 g/cc. When the metal oxide represented by Chemical Formula 1 has a tap density within the above range, an amount per unit volume becomes larger and therefore capacity per volume and entire energy density increases. Specifically, the metal oxide represented by the above Chemical Formula 1 may have a tap density of about 1.2 g/cc to about 1.5 g/cc.

A positive active material for a rechargeable lithium battery according to another embodiment is obtained by using the positive active material precursor for a rechargeable lithium battery, and includes a compound represented by the following Chemical Formula 2.

   [Chemical Formula 2]

$Li_{1+x}[Ni_aCo_bM_cMn_d]_{1-x}O_{2-y}F_y$

In the above Chemical Formula 2,

M is a transition element, $-0.05 \leq x \leq 0.25$, $0 \leq y \leq 0.05$, $0.2 \leq a \leq 0.9$, $0 \leq b \leq 0.5$, $0 \leq c \leq 0.05$, $0.1 \leq d \leq 0.9$, and $a+b+c+d=1$. Specifically, $0.15 \leq x \leq 0.2$, $0 \leq y \leq 0.01$, $0.2 \leq a \leq 0.3$, $0 \leq b \leq 0.2$, $0 \leq c \leq 0.01$, $0.6 \leq d \leq 0.8$, and $a+b+c+d=1$.

The M is the same as described above.

The positive active material for a rechargeable lithium battery is obtained by the positive active material precursor for a rechargeable lithium battery having a high tap density, and thereby has a high tap density and excellent energy density. The positive active material for a rechargeable lithium battery has excellent electrical conductivity, and therefore a rechargeable lithium battery including the same has improved output characteristics and cycle-life characteristics.

The positive active material for a rechargeable lithium battery may include a secondary particle formed by agglomerating a plurality of primary particles.

The primary particle may have an average particle diameter of about 1 nm to about 500 nm. When the primary particle has an average particle diameter within the above range, agglomeration of the primary particles may be effectively controlled, and characteristics of the positive active material including the same may be effectively improved. Specifically, the primary particle may have an average particle diameter of about 2 nm to about 200 nm.

The positive active material for a rechargeable lithium battery may have a tap density of about 1.5 g/cc to about 2.5 g/cc. When the positive active material for a rechargeable lithium battery has a tap density within the above range, an amount per unit volume becomes larger and therefore capacity per volume and entire energy density increases. Specifically, the positive active material for a rechargeable lithium battery may have a tap density of about 1.9 g/cc to about 2.2 g/cc.

The positive active material for a rechargeable lithium battery may have a specific surface area of about 1.0 m²/g to about 10.0 m²/g. When the positive active material for a rechargeable lithium battery has a specific surface area within the above range, a side reaction with an electrolyte solution rather than a nano-sized active material decreases. Specifically, the positive active material for a rechargeable lithium battery may have a specific surface area of about 1.5 m²/g to about 2.5 m²/g.

According to another embodiment, a method of preparing a positive active material for a rechargeable lithium battery includes mixing at least one of a nickel source, a cobalt source, and a manganese source, and a solvent, under an oxidizing atmosphere to form a positive active material precursor for a rechargeable lithium battery represented by the above Chemical Formula 1, and mixing the positive active material precursor for a rechargeable lithium battery and a lithium source followed by heat treatment. Herein, the prepared positive active material for a rechargeable lithium battery includes a compound represented by the above Chemical Formula 2.

The forming of the positive active material precursor for a rechargeable lithium battery is performed under an oxidizing atmosphere, and the positive active material precursor for a rechargeable lithium battery includes the metal oxide instead of a metal hydroxide. The metal oxide has a higher tap density than the metal hydroxide, and therefore a positive active material precursor for a rechargeable lithium battery including the same has a high tap density.

The oxidizing atmosphere may include an air atmosphere, an oxygen ($O_2$) atmosphere, or a combination thereof, but is not limited thereto.

The nickel source may include nickel sulfate, nickel nitrate, nickel acetate, nickel chloride, nickel phosphate, or a combination thereof, but is not limited thereto.

The cobalt source may include cobalt sulfate, cobalt nitrate, cobalt acetate, cobalt chloride, cobalt phosphate, or a combination thereof, but is not limited thereto.

The manganese source may include manganese sulfate, manganese nitrate, manganese acetate, manganese chloride, manganese phosphate, or a combination thereof, but is not limited thereto.

The solvent may include water, ethanol, methanol, or a combination thereof, but is not limited thereto.

In the step of forming the positive active material precursor for a rechargeable lithium battery, the nickel source may be mixed in an amount of about 10 wt % to about 90 wt %, the cobalt source may be mixed in an amount of about 0 wt % to about 50 wt %, the manganese source may be mixed in an amount of about 10 wt % to about 90 wt %, and the solvent may be mixed in a balance amount. Within the amount ranges, the positive active material precursor for a rechargeable lithium battery may be effectively formed. Specifically, in the step of forming the positive active material precursor for a rechargeable lithium battery, the nickel source may be mixed in an amount of about 20 wt % to about 70 wt %, the cobalt source may be mixed in an amount of about 5 wt % to about 20 wt %, the manganese source may be mixed in an amount of about 20 wt % to about 70 wt %, and the solvent may be mixed in a balance amount.

The positive active material precursor for a rechargeable lithium battery may be formed by further including a transition element source. The transition element source may include a sulfate, nitrate, acetate, chloride, or phosphate of a transition element, or a combination thereof, but is not limited thereto.

The lithium source may include lithium nitrate ($LiNO_3$), lithium acetate ($CH_3COOLi$), lithium carbonate ($Li_2CO_3$), lithium hydroxide (LiOH), or a combination thereof, but is not limited thereto.

The active material precursor for a rechargeable lithium battery and the lithium source may be mixed in a mole ratio of about 1.0:0.95 to about 1.0:1.25. When the active material precursor and the lithium source are mixed within the mole ratio range, a positive active material having a layered structure including a compound represented by the following Chemical Formula 1 may be effectively formed. In addition, the lithium transition elements composite oxide having a layered structure has excellent thermal stability and may effectively improve reliability of a battery, even when charge depth increases by heightening charge voltage of the battery. Specifically, the active material precursor and the lithium source may be mixed in a mole ratio of about 1.0:1.02 to about 1.0:1.2.

The heat treatment may be performed through primary firing at about 250° C. to about 650° C. and secondary firing at about 700° C. to about 1100° C. When the heat treatment is performed within the range, moisture and impurities of precipitates may be effectively removed, improving purity of the positive active material. In addition, the heat treatment may effectively control growth of the positive active material particles and secure excellent electrochemical characteristics. Specifically, the heat treatment may be performed through primary firing at about 280° C. to about 630° C. and secondary firing at about 750° C. to about 900° C.

The heat treatment may be performed at a rate of about 1° C./min to about 10° C./min. When the temperature is increased within the range, moisture included in the mixture may be effectively removed. In addition, the heat treatment may effectively control a crystal structure of the mixture and the positive active material formed form the mixture. Specifically, the heat treatment may be performed in a rate of about 2° C./min to about 5° C./min.

The primary firing may be performed for about 5 hours to about 20 hours, and specifically, about 10 hours to about 30 hours. When the primary firing is performed within the time range, moisture and impurities may be effectively removed. In addition, the heat treatment may effectively control the crystal structure of the mixture and the positive active material formed of the mixture. Specifically, the primary firing may be performed for about 5 hours to about 10 hours, and more specifically, for about 10 hours to about 20 hours.

In the method of preparing a positive active material for a rechargeable lithium battery, a complexing agent such as an ammonia aqueous solution, a pH controlling agent such as an alkali aqueous solution providing a hydroxide group, a heat treatment atmosphere, and the like that are well-known in a related art may not be illustrated.

The method may provide a positive active material for a rechargeable lithium battery according to one embodiment of the present invention.

The positive active material for a rechargeable lithium battery may be applied to a positive electrode of an electrochemical battery such as a rechargeable lithium battery. The rechargeable lithium battery includes the positive electrode, a negative electrode including a negative active material, and an electrolyte.

The positive electrode includes a current collector and a positive active material layer disposed on the current collector.

The positive active material layer includes a binder and a conductive material.

The binder improves binding properties of the positive active material particles to each other and to a current collector, and examples of the binder may be polyvinyl alcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material may be used to provide an electrode with conductivity, and any electrically conductive material can be used as a conductive agent unless it causes a chemical change. Examples of the conductive material may include one or more of natural graphite, artificial graphite, carbon black, acetylene black, ketjen black, a carbon fiber, a metal powder, a metal fiber and the like of copper, nickel, aluminum, silver, and the like, and a polyphenylene derivative.

The current collector may use Al, but is not limited thereto.

The negative electrode includes a current collector and a negative active material layer formed on the current collector, and the negative active material layer includes a negative active material.

The negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes a carbon material, and may be any generally-used carbon-based negative active material in a lithium ion rechargeable battery. Examples of the carbon material include crystalline carbon, amorphous carbon, and a mixture thereof. The crystalline carbon may be non-shaped or sheet, flake, spherical, or fiber shaped natural graphite or artificial graphite. The amorphous carbon may be a soft carbon (carbon obtained by firing at a low temperature), a hard carbon (carbon obtained by firing at a high temperature), a mesophase pitch carbonized product, fired coke, and the like.

The lithium metal alloy include lithium and a metal of Na, K, Rb, Cs, Fr, Be, Mg, Ca, Sr, Si, Sb, Pb, In, Zn, Ba, Ra, Ge, Al, or Sn.

The material being capable of doping and dedoping lithium may include Si, $SiO_x$ (0<x<2), a Si-M alloy (wherein M is an alkali metal, an alkaline-earth metal, a Group 13 element, a Group 14 element, a transition element, a rare earth element, or a combination thereof, but is not Si), Sn, $SnO_2$, Sn-M (wherein M is an alkali metal, an alkaline-earth metal, a Group 13 element, a Group 14 element, a transition element, a rare earth element, or a combination thereof, but is not Sn), and the like, and at least one of these materials may be mixed with $SiO_2$. The element M may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include vanadium oxide, lithium vanadium oxide, and the like.

The negative active material layer includes a binder, and optionally a conductive material.

The binder improves properties of binding negative active material particles with one another and the negative active materials with a current collector, and examples of the binder may include polyvinyl alcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is used to provide an electrode with conductivity, and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of metal powder or metal fiber of copper, nickel, aluminum, silver, and the like; a conductive polymer such as a polyphenylene derivative; or a mixture thereof.

The current collector may be a copper foil, a nickel foil, a stainless steel foil, a titanium foil, a nickel foam, a copper foam, a polymer substrate coated with a conductive metal, or a combination thereof.

The positive electrode and the negative electrode may be manufactured by a method including mixing an active material, a binder, or the like in a solvent to prepare an active material composition, and coating the composition on a current collector. The electrode manufacturing method is well known, and thus is not described in detail in the present specification. The solvent includes N-methylpyrrolidone and the like, but is not limited thereto.

An electrolyte filled in the rechargeable lithium battery may be a non-aqueous electrolyte or well-known solid electrolyte, or an electrolyte including a lithium salt dissolve therein.

The non-aqueous electrolyte may include a solvent of cyclic carbonates such as ethylene carbonate, diethylene carbonate, propylene carbonate, butylene carbonate, vinylene carbonate, and the like, linear carbonates such as dimethyl carbonate, ethylmethyl carbonate, diethyl carbonate, and the like, esters such as methyl acetate, ethyl acetate, propyl acetate, methyl propionate, ethyl propionate, γ-butyrolactone, and the like, ethers such as 1,2-dimethoxyethane, 1,2-diethoxyethane, tetrahydrofuran, 1,2-dioxane, 2-methyltetrahydrofuran, and the like, nitriles such as acetonitriles, and amides such as dimethylformamide, but is not limited thereto. These may be used singularly or in plural. Particularly, a mixed solvent of cyclic carbonate and linear carbonate may be used.

The electrolyte may be a gel polymer where an electrolyte solution is impregnated in a polymer electrolyte of polyethylene oxide, polyacrylonitrile, and the like, or an inorganic solid electrolyte of LiI, $Li_3N$, and the like, but is not limited thereto.

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAiO_4$, $LiAlO_2$, $LiAlCl_4$, LiCl, and LiI, but is not limited thereto.

The rechargeable lithium battery may further include a separator between the negative electrode and the positive electrode, as needed. The separator may include polyethylene, polypropylene, polyvinylidene fluoride or multi-layers thereof, mixed multi-layers thereof such as a polyethylene/polypropylene double-layered separator, a polyethylene/polypropylene/polyethylene triple-layered separator, a polypropylene/polyethylene/polypropylene triple-layered separator, and the like.

Rechargeable lithium batteries may be classified as lithium ion batteries, lithium ion polymer batteries, and lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size. Structures and manufacturing methods for lithium ion batteries pertaining to the present invention are well known in the art.

FIG. 1 is a schematic view of a rechargeable lithium battery according to one embodiment of the present invention. As shown in FIG. 1, the rechargeable lithium battery 100 includes a negative electrode 112, a positive electrode 114, and a separator 113 interposed between the negative electrode 112 and the positive electrode 114, an electrolyte (not shown) impregnated in the negative electrode 112, the positive electrode 114, and the separator 113, and a sealing member 140 sealing the battery case 120. The rechargeable lithium battery of the present embodiment may not be limited to specific shapes, and may have any shape such as cylindrical, coin-type, pouch-type, and the like if the rechargeable lithium battery is operative.

Hereinafter, examples and comparative examples are described. However, the following examples are specific examples of the present invention, and the present invention is not limited by the following examples.

EXAMPLE 1

Preparation of Positive Active Material Precursor for a Rechargeable Lithium Battery 4 L of distilled water was put in a co-precipitation reactor (with a capacity of 4 L and a spinning motor having output power of greater than or equal to 80 W), air was fed in to the reactor at 0.5 liters/minute, and the resultant was agitated at a speed of 1000 rpm while maintaining it at 50° C.

A 2.0 M metal aqueous solution including a mixture of nickel sulfate, cobalt sulfate, and manganese sulfate mixed in a mole ratio of 2:1:7 was added to the reactor at a speed of 0.3 L/hour, and a 4.0 M ammonia solution was added thereto at a speed of 0.03 L/hour. In addition, the mixture was supplied with a 4.0 M sodium hydroxide solution to adjust the mixture to have pH of 10. Herein, an impeller was adjusted to have a speed of 1000 rpm. The flow of the resultant solution was adjusted to stay for about 6 hours in the reactor. When the reaction reached a steady state, a metal oxide $[Ni_{0.2}Co_{0.1}Mn_{0.7}]_3O_4$ was continuously obtained through an overflow pipe.

The metal oxide was filtered, washed with water, and dried in a 110° C. warm air drier for 15 hours. Thereby, a positive active material precursor for a rechargeable lithium battery including the metal oxide $[Ni_{0.2}Co_{0.1}Mn_{0.7}]_3O_4$ was prepared.

EXAMPLE 2

Preparation of Positive Active Material for a Rechargeable Lithium Battery

The metal oxide $[Ni_{0.2}Co_{0.1}Mn_{0.7}]_3O_4$ prepared in Example 1 and lithium nitrate ($LiNO_3$) were mixed in a mole ratio of 1.0:1.19. The mixture was primarily fired by increasing the temperature at a rate of 2° C./min and maintaining it at 280° C. for 5 hours, and secondarily fired at 900° C. for 10 hours, preparing a positive active material for a rechargeable lithium battery, a $Li_{1.19}[Ni_{0.2}Co_{0.1}Mn_{0.7}]_{0.81}O_2$ powder.

EXAMPLE 3

Fabrication of Rechargeable Lithium Battery Cell

The positive active material for a rechargeable lithium battery according to Example 2, Super-P as a conductive material, and polyvinylidene fluoride (PVdF) as a binder were mixed in a weight ratio 85:7.5:7.5, preparing a slurry. The slurry was uniformly coated on a 20 μm-thick aluminum foil and vacuum-dried at 120° C., fabricating a positive electrode.

The positive electrode was used with a lithium foil as a counter electrode, a 25 μm-thick porous polyethylene film (Celgard 2300, Celgard LLC) as a separator, and a liquid electrolyte solution prepared by mixing ethylene carbonate and diethyl carbonate in a volume ratio of 1:1 and dissolving LiPF$_6$ in a concentration of 1 M therein, fabricating a half coin cell.

COMPARATIVE EXAMPLE 1

Preparation of Positive Active Material Precursor for a Rechargeable Lithium Battery 4 L of distilled water was put in a co-precipitation reactor (with a capacity of 4 L and a spinning motor having output power of greater than or equal to 80 W), air was fed in to the reactor at 0.5 liters/minute, and the resultant was agitated at a speed of 1000 rpm while maintaining it at 50° C.

A 2.0 M metal aqueous solution including a mixture of nickel sulfate, cobalt sulfate, and manganese sulfate mixed in a mole ratio of 2:1:7 was added to the reactor at a speed of 0.3 L/hour, and a 4.0 M ammonia solution was added thereto at a speed of 0.03 L/hour. In addition, the mixture was supplied with a 4.0 M sodium hydroxide solution to adjust the mixture to have pH of 10. Herein, an impeller was adjusted to have a speed of 1000 rpm. The flow of the resultant solution was adjusted to stay for about 6 hours in the reactor. When the reaction reached a steady state, metal hydroxide $Ni_{0.2}Co_{0.1}Mn_{0.7}](OH)_2$ was continuously obtained through an overflow pipe.

The metal hydroxide was filtered, washed with water, and dried in a 110° C. warm air drier for 15 hours. Thereby, a positive active material precursor for a rechargeable lithium battery including metal hydroxide $[Ni_{0.2}Co_{0.1}Mn_{0.7}](OH)_2$ was prepared.

COMPARATIVE EXAMPLE 2

Positive Active Material for a Rechargeable Lithium Battery

The metal hydroxide $[Ni_{0.2}Co_{0.4}Mn_{0.7}](OH)_2$ and lithium nitrate (LiNO$_3$) were mixed in a mole ratio of 1.0:1.19. The mixture was primarily fired by increasing the temperature at a rate of 2° C./min and maintaining it at 280° C. for 5 hours and secondarily fired at 900° C. for 10 hours, preparing a positive active material for a rechargeable lithium battery, a $Li_{1.19}[Ni_{0.2}Co_{0.1}Mn_{0.7}]_{0.81}O_2$ powder.

COMPARATIVE EXAMPLE 3

Fabrication of Rechargeable Lithium Battery Cell

The positive active material for a rechargeable lithium battery according to Comparative Example 2, Super-P as a conductive material, and polyvinylidene fluoride (PVdF) as a binder were mixed with a weight ratio 85:7.5:7.5, preparing a slurry. The slurry was uniformly coated on a 20 µm-thick aluminum foil and vacuum-dried at 120° C., fabricating a positive electrode.

The positive electrode was used with a lithium foil as a counter electrode, a 25 µm-thick porous polyethylene film (Celgard 2300, Celgard LLC) as a separator, and a liquid electrolyte solution prepared by mixing ethylene carbonate and diethyl carbonate in a volume ratio of 1:1 and dissolving LiPF$_6$ in a concentration of 1 M therein, fabricating a half coin cell.

EXPERIMENTAL EXAMPLE 1

Scanning Electron Microscope (SEM) Photographs

The positive active material precursors for a rechargeable lithium battery according to Example 1 and Comparative Example 1 and the positive active materials for a rechargeable lithium battery according to Example 2 and Comparative Example 2 were respectively deposited on a carbon-coated copper grid, and a SEM photograph was taken of the cross-sections thereof. Herein, a field emission gun scanning electron microscope (FEG-SEM) (JSM-6390, JEOL Ltd.) was used.

Figure 2:
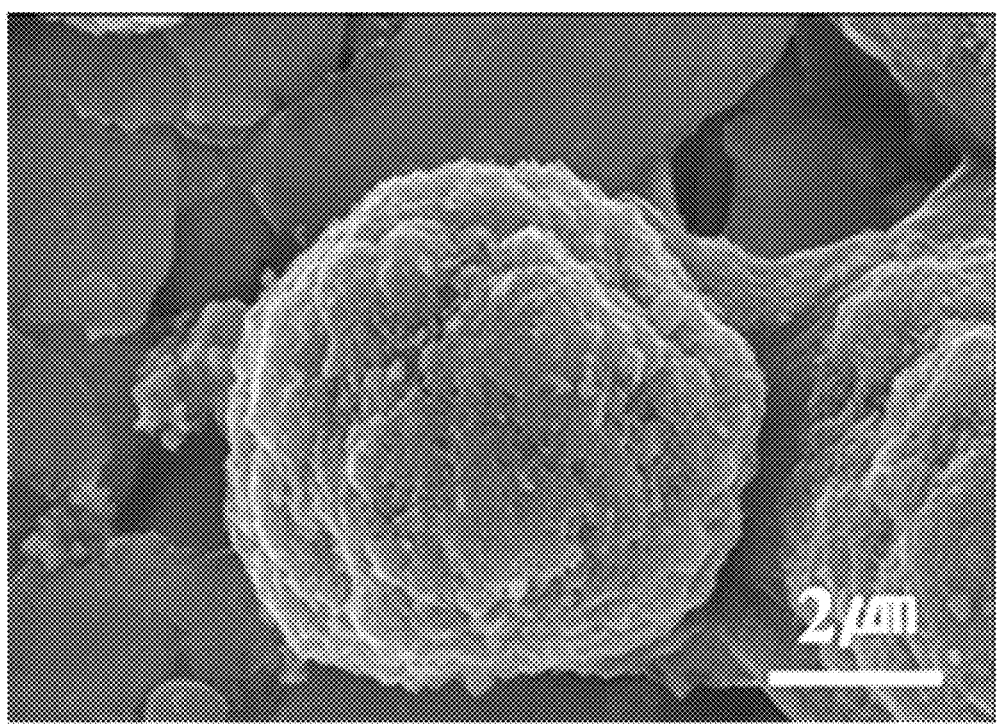
FIG. 2 is a SEM photograph showing a positive active material precursor for a rechargeable lithium battery according to Example 1.
Figure 3:
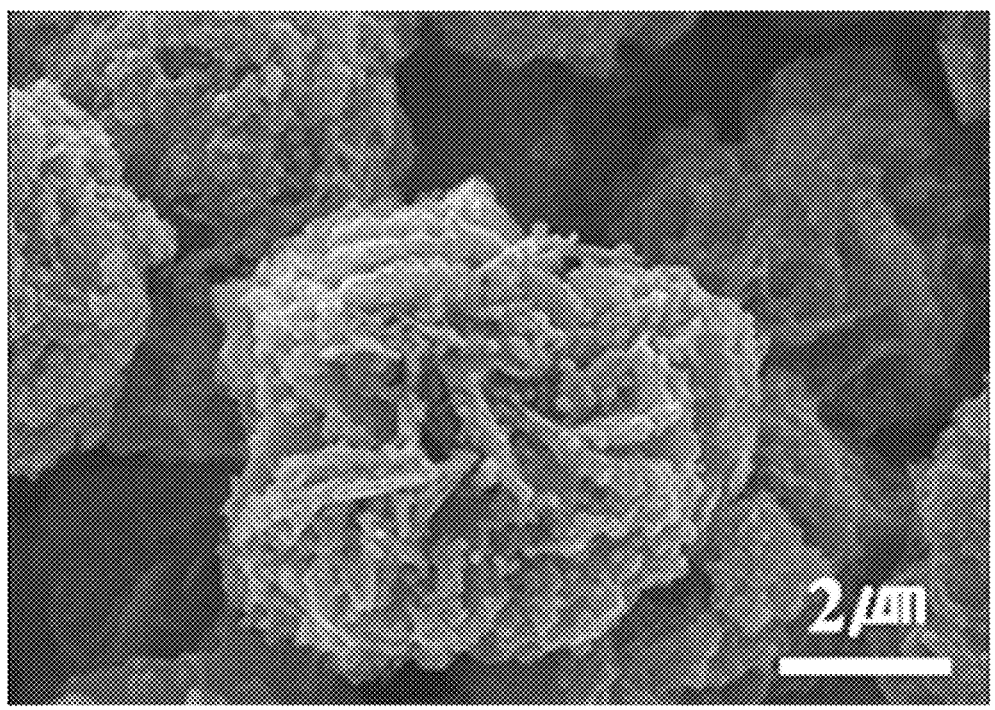
FIG. 3 is a SEM photograph showing a positive active material precursor for a rechargeable lithium battery according to Comparative Example 1.

FIG. 2 shows a SEM photograph of the positive active material precursor for a rechargeable lithium battery according to Example 1, and FIG. 3 shows a SEM photograph of the positive active material precursor for a rechargeable lithium battery according to Comparative Example 1.

Figure 4:
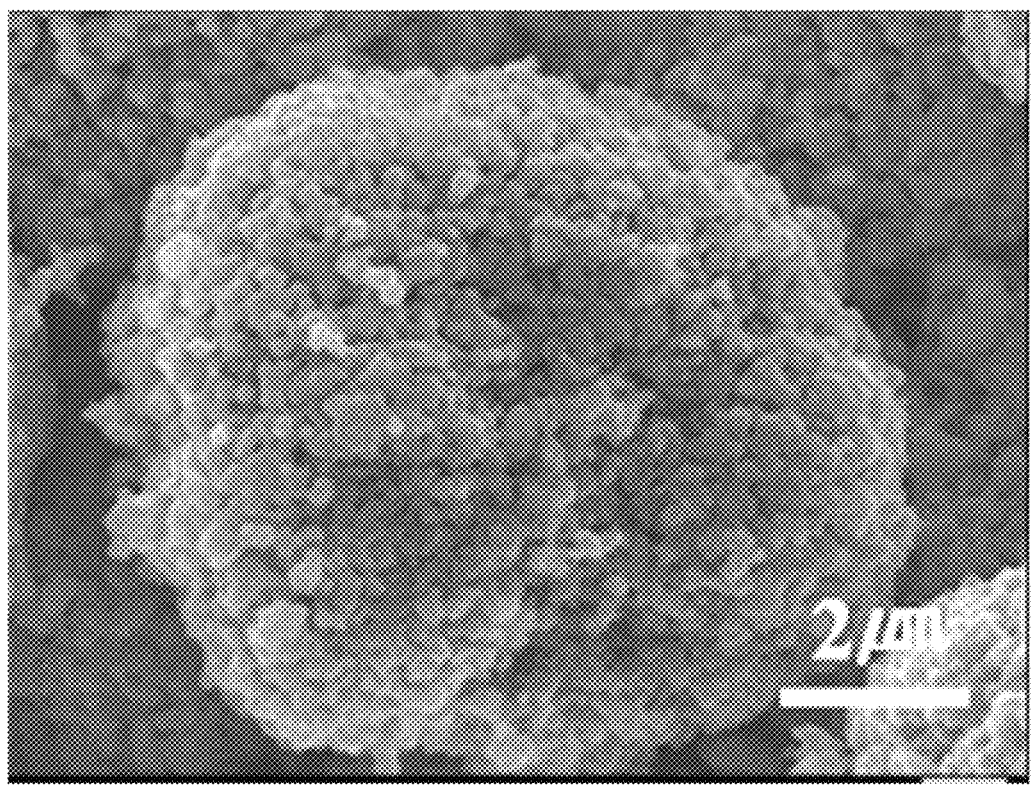
FIG. 4 is a SEM photograph showing a positive active material precursor for a rechargeable lithium battery according to Example 2.
Figure 5:
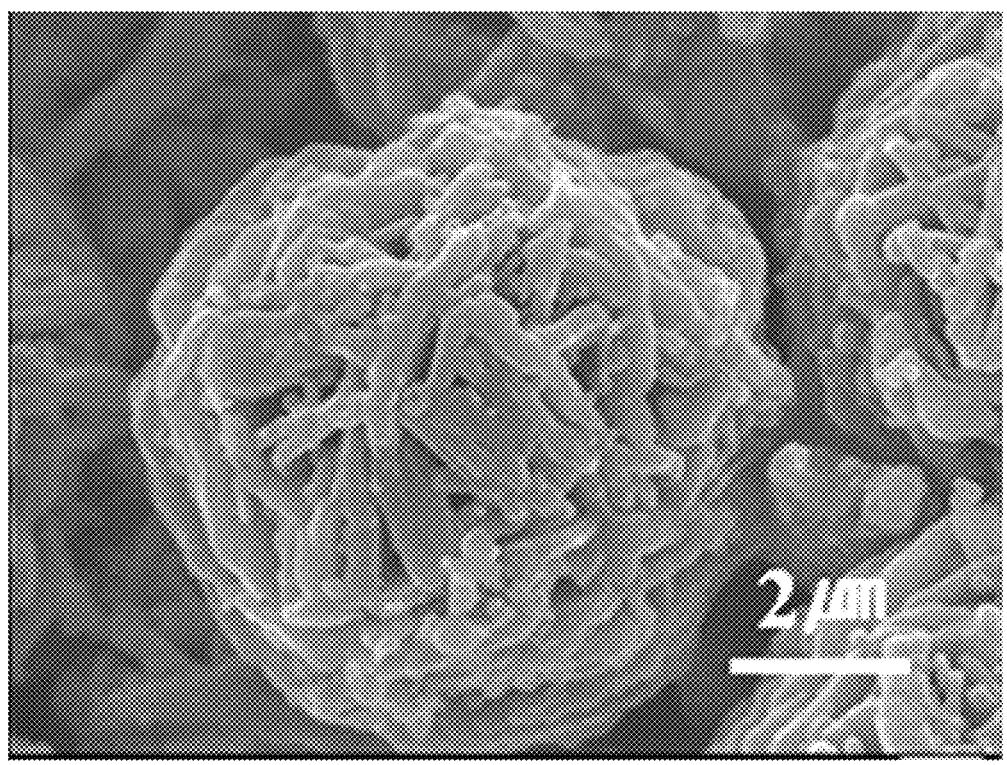
FIG. 5 is a SEM photograph showing a positive active material precursor for a rechargeable lithium battery according to Comparative Example 2.

In addition, FIG. 4 shows a SEM photograph of the positive active material for a rechargeable lithium battery according to Example 2, and FIG. 5 shows a SEM photograph of the positive active material for a rechargeable lithium battery according to Comparative Example 2.

As shown in FIG. 2, the positive active material precursor for a rechargeable lithium battery according to Example 1 has a spherical shape with an average particle diameter of about 7 µm. As shown in FIG. 3, the positive active material precursor for a rechargeable lithium battery according to Comparative Example 1 is a spherically-shaped powder having an average particle diameter of about 7 µm.

However, referring to morphology, the positive active material precursor for a rechargeable lithium battery prepared in Example 1 has high powder packing density and a more spherical shape compared with the positive active material precursor for a rechargeable lithium battery prepared in Comparative Example 1.

As shown in FIG. 4, the positive active material for a rechargeable lithium battery prepared in Example 2 includes a secondary particle formed by agglomerating a plurality of primary particles, and the primary particles have an average particle diameter of about 100 nm.

As shown in FIG. 5, the positive active material for a rechargeable lithium battery prepared in Comparative Example 2 includes a secondary particle formed by agglomerating a plurality of primary particles, and the primary particles have an average particle diameter of about 250 nm.

The positive active material for a rechargeable lithium battery prepared in Example 2 includes smaller primary particles, so intercalation and deintercalation of lithium ions may be carried out more easily than with the positive active material for a rechargeable lithium battery prepared in Comparative Example 2.

EXPERIMENTAL EXAMPLE 2

Transmission Electron Microscope (TEM) Photographs

The positive active materials for a rechargeable lithium battery according to Example 2 and Comparative Example 2 were respectively deposited on a carbon-coated copper grid, and a TEM photograph was taken of cross-sections thereof. Herein, a field-emission transmission electron microscope (FE-TEM) 2010F (JEOL Ltd.) operated at 200 kV was used.

Figure 6:
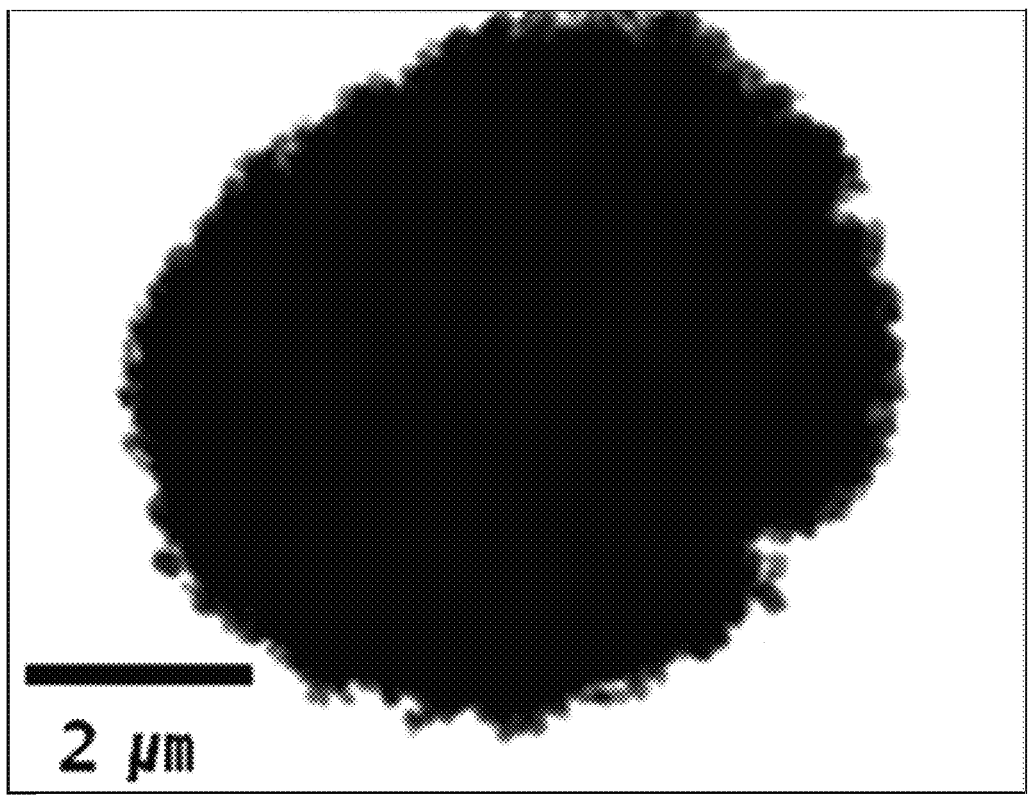
FIG. 6 is a TEM photograph showing a positive active material precursor for a rechargeable lithium battery according to Example 2.
Figure 7:
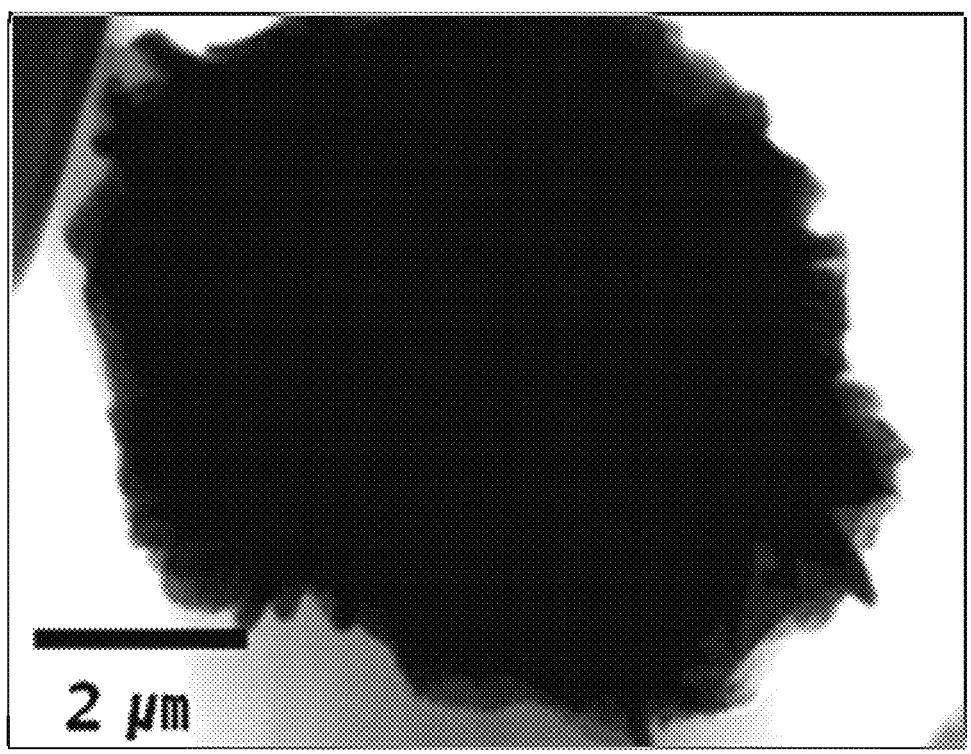
FIG. 7 is a TEM photograph showing a positive active material precursor for a rechargeable lithium battery according to Comparative Example 2.

FIG. 6 shows the TEM photograph of the positive active material for a rechargeable lithium battery according to Example 2, and FIG. 7 shows the TEM photograph of the positive active material for a rechargeable lithium battery according to Comparative Example 2.

As shown in FIG. 6, the positive active material for a rechargeable lithium battery according to Example 2 includes primary particles having a size of about 100 nm and that are distributed uniformly on a surface.

As shown in FIG. 6, the positive active material for a rechargeable lithium battery according to Comparative Example 2 includes primary particles having a size of greater than or equal to about 200 nm and are distributed uniformly on a surface.

That is to say, the positive active material for a rechargeable lithium battery prepared in Example 2 includes primary particles that are smaller and that are distributed uniformly compared with the positive active material for a rechargeable lithium battery prepared in Comparative Example 2.

EXPERIMENTAL EXAMPLE 3

Tap Density 500 drop strokes were respectively performed for the positive active material precursor for a rechargeable lithium battery according to Example 1 and Comparative Example 1 and the positive active material for a rechargeable lithium battery according to Example 2 and Comparative Example 2 using a 10 ml graduated cylinder, and they were measured regarding tap density.

The positive active material precursor for a rechargeable lithium battery according to Example 1 had a tap density of 1.5 g/cc, the positive active material precursor for a rechargeable lithium battery according to Comparative Example 1 had a tap density of 1.2 g/cc, the positive active material according to Example 2 had a tap density of 2.0 g/cc, and the positive active material precursor for a rechargeable lithium battery according to Comparative Example 2 had a tap density of 1.5 g/cc.

Accordingly, the positive active material precursor for a rechargeable lithium battery had a higher tap density than the one according to Comparative Example 1, and the positive active material according to Example 2 had a higher tap density than the one according to Comparative Example 2.

EXPERIMENTAL EXAMPLE 4

Specific Surface Area

The positive active materials for rechargeable lithium batteries according to Example 2 and Comparative Example 2 were respectively measured regarding specific surface area using a BET analyzer (AS1-A4).

The positive active material according to Example 2 had a specific surface area of about 1.73 m²/g, and the positive active material according to Comparative Example 2 had a specific surface area of about 2.35 m²/g.

Accordingly, the positive active material for a rechargeable lithium battery according to Example 2 has a larger specific surface area than the one according to Comparative Example 2.

EXPERIMENTAL EXAMPLE 5

Initial Charge Capacity, Initial Discharge Capacity, and Initial Coulomb Efficiency The half coin cells according to Example 3 and Comparative Example 3 were respectively charged and discharged once at 2.0 V to 4.6 V at 0.1 C (20 mA/g) at 30° C. and measured regarding initial charge capacity, initial discharge capacity, and coulomb efficiency.

The half coin cell according to Example 3 had initial charge capacity of 317.8 mAh/g, initial discharge capacity of 263.3 mAh/g, and coulomb efficiency of 82.9%.

The half coin cell according to Comparative Example 3 had initial charge capacity of 299.3 mAh/g, initial discharge capacity of 246.9 mAh/g, and coulomb efficiency of 82.5%.

Accordingly, the positive active material for a rechargeable lithium battery according to Example 3 had excellent initial charge capacity, initial discharge capacity, and coulomb efficiency compared with the one according to Comparative Example 3.

The reason that the positive active materials according to Examples 3 and 4 had excellent properties is that the positive active materials had small primary particles and thus easily intercalated and deintercalated lithium ions.

EXPERIMENTAL EXAMPLE 6

Cycle-Life Characteristic

The half coin cells according to Example 3 and Comparative Example 3 were respectively charged and discharged at 2.0 V to 4.6 V at 0.1 C (20 mA/g) and measured regarding discharge capacity change. The results are provided in FIG. 8.

Figure 8:
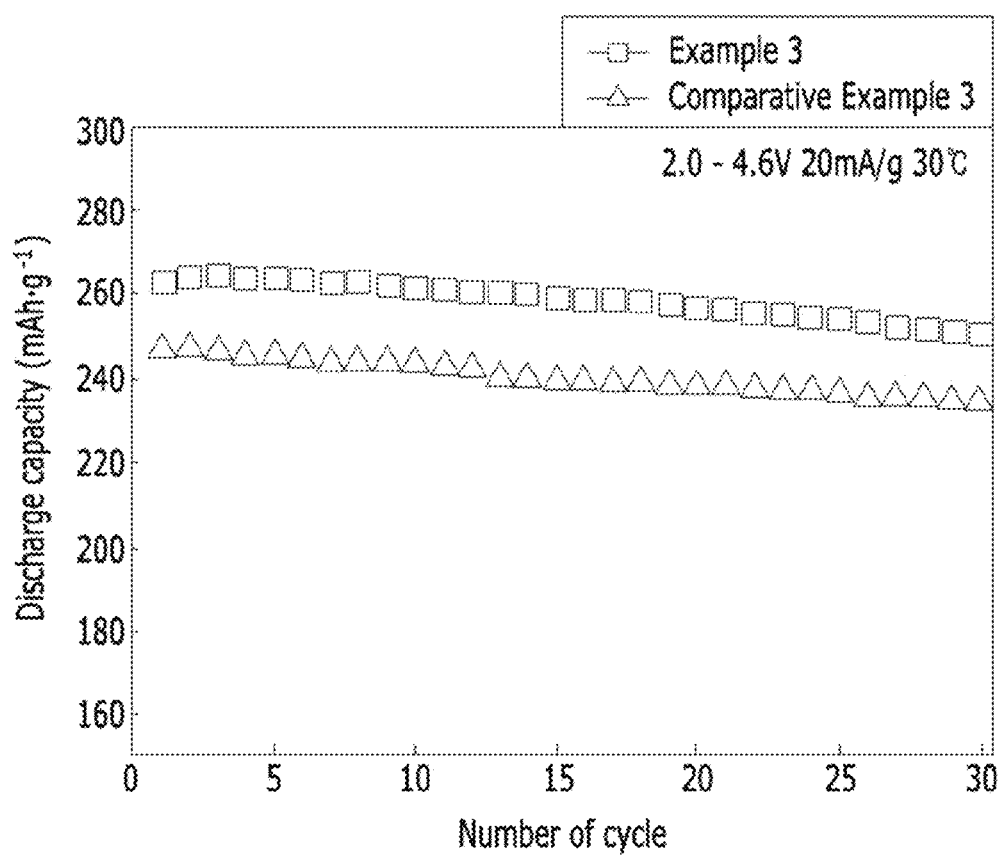
FIG. 8 is a graph showing cycle-life characteristics of coin half-cells according to Example 3 and Comparative Example 3.

As shown in FIG. 8, after charge and discharge 18 times, the cell including the positive active material for a rechargeable lithium battery according to Example 2 had capacity retention of about 95%, and the cell including the positive active material for a rechargeable lithium battery according to Comparative Example 2 had capacity retention of about 95%.

Accordingly, the coin half-cell according to Example 3 had higher capacity than the coin half-cell according to Comparative Example 3, and maintained cycle-life characteristics similar to those of Comparative Example 3.

EXPERIMENTAL EXAMPLE 7

High Rate Capability

The coin half-cells according to Example 3 and Comparative Example 3 were charged and discharged while varying C-rates to be 0.1 C, 0.2 C, 0.5 C, 1 C, 2 C, and 5 C. The results are provided in FIG. 9.

Figure 9:
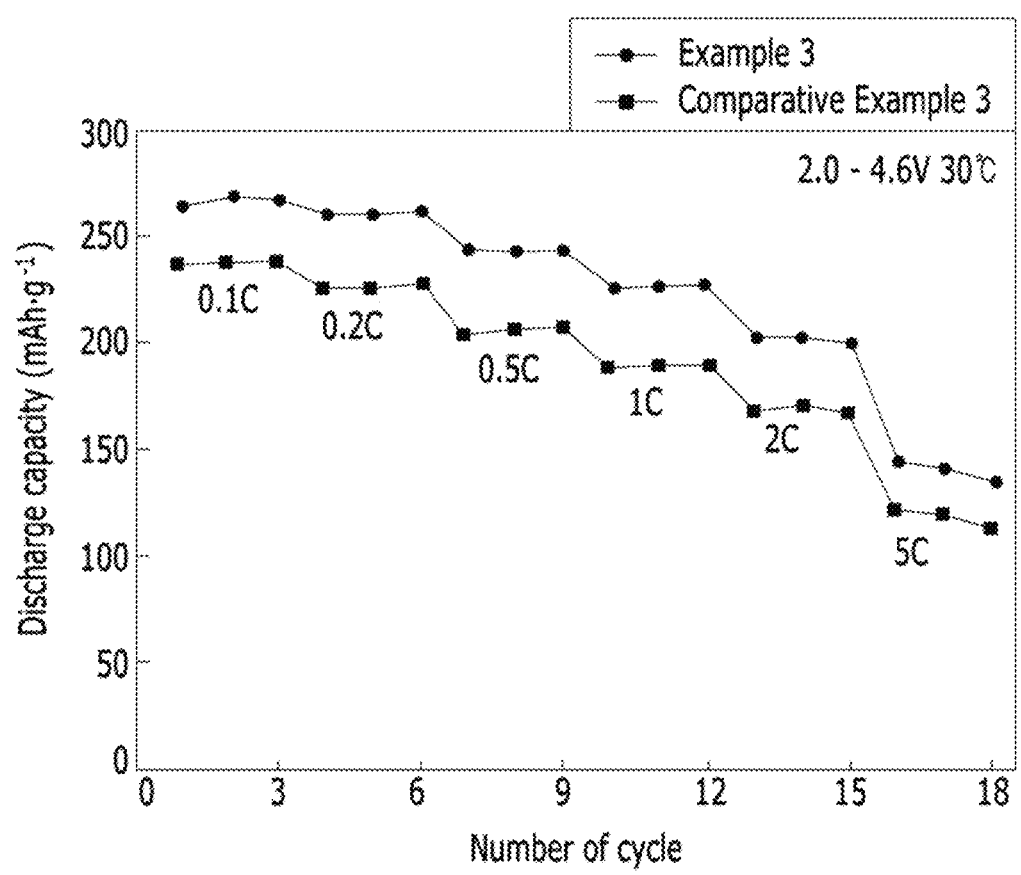
FIG. 9 is a graph showing high rate capability of coin half-cells according to Example 3 and Comparative Example 3.

As shown in FIG. 9, the coin half-cells according to Example 3 showed high rate capability compared with that of the Comparative Example 3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A positive active material precursor for a rechargeable lithium battery, the positive active material precursor consisting of a metal oxide represented by the following Chemical Formula 1:

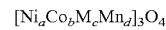  [Chemical Formula 1]

$[Ni_a Co_b M_c Mn_d]_3 O_4$ wherein, in the above Chemical Formula 1,
M is a transition element,
$0.2 \leq a \leq 0.9$, $0 < b \leq 0.5$, $0 \leq c \leq 0.05$, $0.1 \leq d \leq 0.9$, and $a+b+c+d=1$, wherein the metal oxide represented by the above Chemical Formula 1 has an average particle diameter of 5 μm to 15 μm, and wherein the metal oxide represented by the above Chemical Formula 1 has a tap density of 1.0 g/cc to 2.0 g/cc.

2. The positive active material precursor for a rechargeable lithium battery of claim 1, wherein $0<c\leq0.05$, and the M comprises Ti, V, Cr, Fe, Cu, Zn, Y, Zr, Nb, Mo, W, or a combination thereof.

3. The positive active material precursor for a rechargeable lithium battery of claim 1, wherein the metal oxide represented by the above Chemical Formula 1 is a spherically-shaped powder.

4. A method of preparing a positive active material for a rechargeable lithium battery, comprising:

mixing a nickel source, a manganese source, a cobalt source, and a solvent, under an oxidizing atmosphere to form a positive active material precursor for a rechargeable lithium battery represented by the following Chemical Formula 1; and mixing the positive active material precursor and a lithium source followed by heat treatment to prepare a compound represented by the following Chemical Formula 2:

$$[Ni_aCo_bM_cMn_d]_3O_4 \qquad \text{[Chemical Formula 1]}$$

wherein, in the above Chemical Formula 1,
M is a transition element,
$0.2\leq a\leq0.9$, $0<b\leq0.5$, $0\leq c\leq0.05$, $0.1\leq d\leq0.9$, $a+b+c+d=1$, $$Li_{1+x}[Ni_aCo_bM_cMn_d]_{1-x}O_{2-y}F_y \qquad \text{[Chemical Formula 2]}$$

wherein in the above Chemical Formula 2,
M is a transition element,
$-0.05\leq x\leq0.25$,
$0\leq y\leq0.05$,
$0.2\leq a\leq0.9$, $0<b\leq0.5$, $0\leq c\leq0.05$, $0.1\leq d\leq0.9$, and $a+b+c+d=1$, wherein, the oxidizing atmosphere comprises an air atmosphere, an oxygen ($O_2$) atmosphere, or a combination thereof, wherein, the heat treatment is performed through primary firing at a temperature of 250° C. to 650° C. and secondary firing at a temperature of 700° C. to 1100° C.

5. The method of preparing a positive active material for a rechargeable lithium battery of claim 4, wherein $0<c\leq0.05$, the M comprises Ti, V, Cr, Fe, Cu, Zn, Y, Zr, Nb, Mo, W, or a combination thereof.

6. The method of preparing a positive active material for a rechargeable lithium battery of claim 4, wherein the nickel source comprises nickel sulfate, nickel nitrate, nickel acetate, nickel chloride, nickel phosphate, or a combination thereof.

7. The method of preparing a positive active material for a rechargeable lithium battery of claim 4, wherein the cobalt source comprises cobalt sulfate, cobalt nitrate, cobalt acetate, cobalt chloride, cobalt phosphate, or a combination thereof.

8. The method of preparing a positive active material for a rechargeable lithium battery of claim 4, wherein the manganese source comprises manganese sulfate, manganese nitrate, manganese acetate, manganese chloride, manganese phosphate, or a combination thereof.

9. The method of preparing a positive active material for a rechargeable lithium battery of claim 4, wherein the solvent comprises water, ethanol, methanol, or a combination thereof.

10. The method of preparing a positive active material for a rechargeable lithium battery of claim 4, wherein in the step of forming the positive active material precursor for a rechargeable lithium battery, the nickel source is mixed in an amount of about 10 wt % to about 90 wt %, the cobalt source is mixed in an amount more than about 0 wt % to less than or equal to about 50 wt %, the manganese source is mixed in an amount of about 10 wt % to about 90 wt %, and the solvent is mixed in an balance amount, based on the 100 wt % of the mixture for forming the positive active material precursor for a rechargeable lithium battery.

11. The method of preparing a positive active material for a rechargeable lithium battery of claim 4, wherein in the step of forming the positive active material precursor, a transition element source is further mixed.

12. The method of preparing a positive active material for a rechargeable lithium battery of claim 11, wherein the transition element source comprises a sulfate, nitrate, acetate, chloride, or phosphate of a transition element, or combination thereof.

13. The method of preparing a positive active material for a rechargeable lithium battery of claim 4, wherein the lithium source comprises lithium nitrate ($LiNO_3$), lithium acetate ($CH_3COOLi$), lithium carbonate ($Li_2CO_3$), lithium hydroxide (LiOH), or a combination thereof.

14. The method of preparing a positive active material for a rechargeable lithium battery of claim 4, wherein the active material precursor for a rechargeable lithium battery and the lithium source are mixed in a more ratio of 1.0:0.95 to 1.0:1.25.

* * * * *